No. 706,794. Patented Aug. 12, 1902.
E. BENOIT.
MULTIPLYING GEARING.
(Application filed Sept. 20, 1901.)
(No Model.)
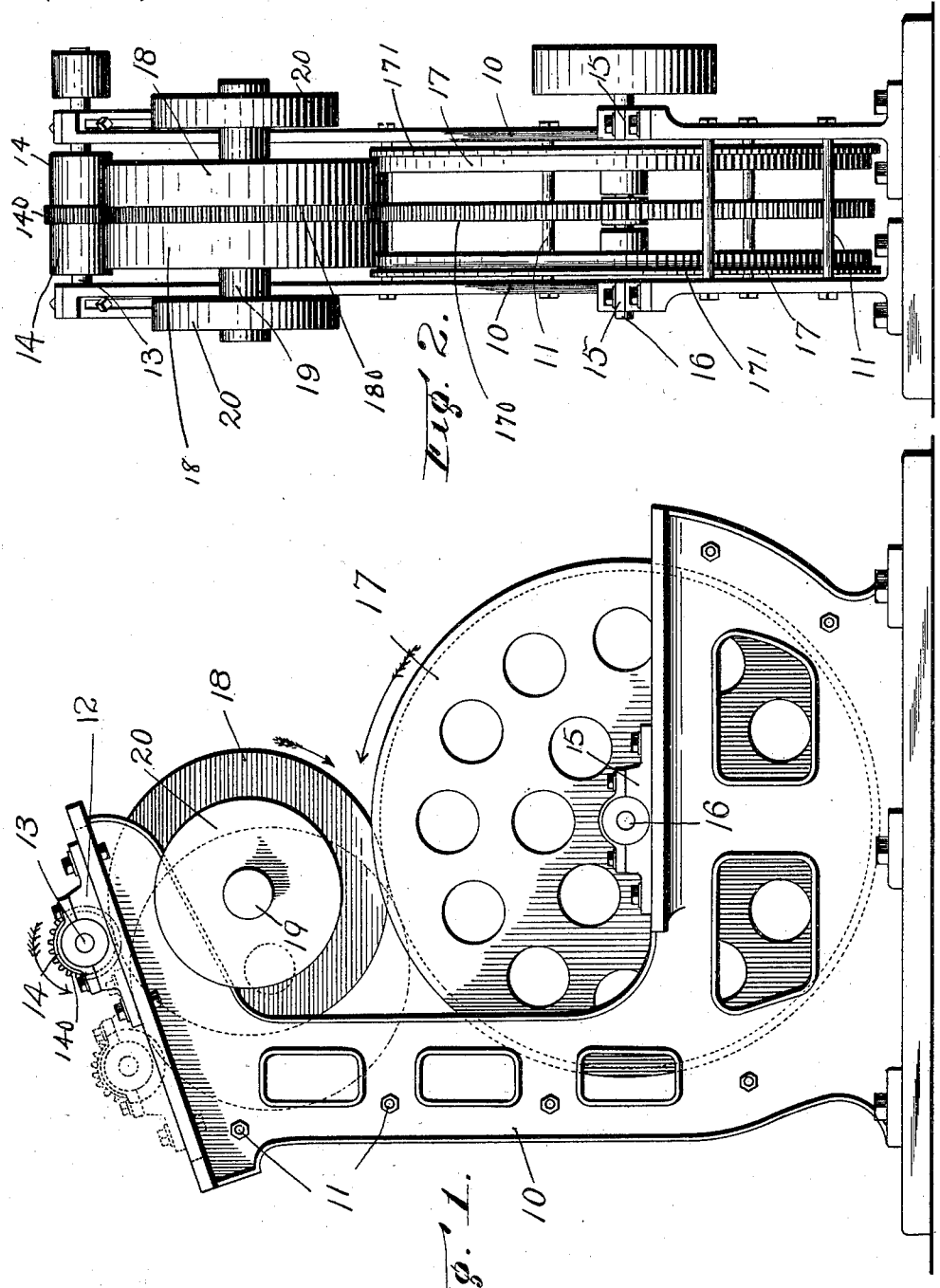
Witnesses
C. F. Wesson.
R. H. Southgate
Inventor
E. Benoit
By
Southgate & Southgate
Attorneys.

UNITED STATES PATENT OFFICE.

ELIE BENOIT, OF WORCESTER, MASSACHUSETTS.

MULTIPLYING-GEARING.

SPECIFICATION forming part of Letters Patent No. 706,794, dated August 12, 1902.

Application filed September 20, 1901. Serial No. 75,806. (No model.)

*To all whom it may concern:*

Be it known that I, ELIE BENOIT, a citizen of the United States, residing at Worcester, in the county of Worcester and State of Massachusetts, have invented a new and useful Multiplying-Gearing, of which the following is a specification.

This invention relates to an improved construction for transmitting power from a driving-shaft to a shaft to be driven.

The especial object of the invention is to provide a strong, simple, and efficient gearing for transmitting power from a driving-shaft turning at one speed to a driven shaft which shall turn at a lower or higher speed which will maintain a constant or substantially constant speed ratio between the two shafts and which will provide a multiplying-gearing which will operate with small frictional loss.

To these ends the invention consists of the multiplying-gearing and of the combination of parts therein, as hereinafter described, and more particularly pointed out in the claims at the end of this specification.

In the accompanying drawings, Figure 1 is a side view of a multiplying-gearing constructed according to this invention, and Fig. 2 is an end view of the same.

In transmitting power by means of the ordinary transmitting gear-trains heretofore employed, especially in speed-reducing gear-trains designed to reduce the speed and increase the torque of a driven shaft, large percentages of the power transmitted have been lost on account of the frictional resistance of the power-transmitting train. For example, in the use of ordinary spur-gearing there is a large frictional loss on account of the grinding or friction of the gear-teeth upon each other. This especially is the case when the power applied to the driving-shaft is a varying one or the resistance of the driven shaft or the parts actuated thereby is a variable one, because in the ordinary forms of gearing no slip or give is possible, whereby the varying strains in the gearing tend to grind or wear the gear-teeth.

The frictional losses in the transmission of power by means of belting or friction-trains are not so large as when gearing is used; but the use of friction driving-trains is objectionable, however, in many locations where it is desired to maintain a constant speed ratio between the driving-shaft and the driven shaft, because a slip of the belt or friction-disk in a friction-train is a loss in the relative ratio, which is not made up thereafter.

The especial object of my invention is therefore to provide a power-transmitting or multiplying gear-train which will give a yielding power-storing connection between the two shafts and which may be operated, therefore, with less frictional loss between the two shafts than the ordinary gear-trains and which will maintain a substantially constant speed ratio between the two shafts.

To these ends, a multiplying-gearing constructed according to my invention comprises a gear on each, the driving-shaft and the shaft to be driven, and a loosely-arranged heavy intermediate gear which normally tends to wedge itself by gravity between the two gears in opposition to the relative rotation of these parts. By this construction the heavy intermediate will be free to rise and fall under varying conditions and will store up considerable power by its inertia to help the easy running of the device. Wheels are provided adjacent to each of said gears, so as to keep the same in proper mesh.

The device can be used either in locations where it is desired to increase the torque of the driven shaft by decreasing the speed or in locations where it is desired to increase the speed of the driven shaft by decreasing the torque.

The further details of the invention will be best understood by referring to the accompanying drawings, forming part of this application.

In detail in said drawings, which show one way my invention may be practiced, 10 10 designate two suitable side frames, which are secured to a suitable base-piece and which are tied together by suitable tie-rods 11 11. The tops of the side frames are inclined and slotted, as shown. Adjustably secured on the same are boxes 12 12, in which is journaled a shaft 13, which for the purposes of the present explanation will be termed the "driving-shaft." The boxes 12 12, and thereby the driving-shaft 13, may be adjusted up and down on the inclined upper faces of the side frames 10 10 for a purpose hereinafter described. Arranged on the said shaft 13 is a gear 140, which preferably has friction wheels or disks 14 14 at each side thereof of a diameter equal to the pitch-diameter of the gear 140. A pulley or crank or other means of applying power is arranged on the said shaft 13.

The power-transmitting intermediate gear is designated by the numeral 180. The same is arranged on a heavy shaft 19 and has large wheels 18 18 at each side thereof of a diameter equal to the pitch-diameter of said gear 180. If it is desired to further increase the weight of the intermediate power-transmitting device, heavy wheels or disks 20 20 can be arranged on the shaft 19 outside of the side frames 10 10, as shown. Journal-boxes 15 15 are adjustably secured on horizontal portions of the side frames 10 10. Journaled in these boxes is a shaft 16, which for the purposes of the present description will be termed the "driven" shaft. Secured on this driven shaft is a gear 170, which is arranged to mesh with gear 180 of the intermediate power-transmitting device. Also secured on the shaft 19 are wheels 17 17, of a diameter equal to the pitch-diameter of the gear 170. These gears 17 17 have extending flanges 171, as shown, for the purpose of keeping the intermediate power-transmitting device axially in place. It will be noted that the intermediate power-transmitting device is arranged at one side of the vertical plane of the driven shaft 16, whereby the same tends to move by gravity to the left, as shown in Fig. 1, thereby tending to wedge itself tightly in position to secure a rigid mesh between the gears.

Power is transmitted to the shaft 13 in a direction which will turn the parts in the directions indicated by the arrows. When power is applied to the parts in this way, the same will tend to cause the intermediate power-transmitting device to move slightly to the right, which movement will be proportional to the resistance of the driven shaft and the parts actuated therefrom. A pulley or crank or other suitable device is arranged on the driven shaft 16 to take the power therefrom. As the device attains full speed the intermediate power-transmitting device will find its proper place, so that the power will be transmitted with very little frictional loss. Varying conditions in the power applied to the shaft 13 or in the resistance of the driven shaft 16 and the parts actuated thereby will be compensated for by a slight rising or falling movement of the intermediate power-transmitting device, thereby obviating the ordinary intense strain and grinding usually found in the ordinary gear-trains. These slight variations will not affect the speed ratio as a whole. It will be noticed that the positions of the shafts 13 and 16 may be adjusted so that the rising-and-falling movement of the intermediate power-transmitting device may be adjusted to varying conditions. The previous description applies when the device is to be used for the purpose of increasing the torque of the driven shaft by reducing the speed. When the device is to be used for the opposite purpose—that is, for the purpose of increasing the speed by decreasing the torque—power is applied to the shaft 16 in such manner as to turn the same in a direction opposite to that indicated by the arrow. The shaft 16 thus becomes the driving-shaft and the shaft 13 the driven shaft. The device will then work substantially the same as before, except that the intermediate power-transmitting device will be lifted from its normal position by the action of the gear 170, and the shaft 13, which is now the driven shaft, will turn at a higher speed than the shaft 16, which is now the driving-shaft, but with less torque than said shaft 16.

In some cases where losses in the speed ratio can be neglected I contemplate omitting the gear 170 and using only the gears 140 and 180 and in other cases omitting all the gearing and depending upon the friction of the wheels, which will then act as friction-gears.

Other arrangements of gearing and of the various parts may be devised for carrying out the principle of my invention as expressed in the claims without departing from the scope thereof.

Having thus fully described my invention, what I claim, and desire to secure by Letters Patent, is—

1. In a power-transmitting gearing, the combination of a driving-shaft having a gear thereon, a shaft to be driven having a gear thereon, and a floating intermediate power-transmitting gear supported without internal bearings so as to normally tend to wedge itself by gravity between the driving and driven gears.

2. In a power-transmitting device, the combination of a driving-shaft having a toothed gear thereon, a shaft to be driven having a toothed gear thereon, and a heavy floating intermediate power-transmitting gear arranged without internal bearings in position to wedge itself by gravity between the toothed gears.

3. In a power-transmitting device, the combination of a shaft to be driven having a gear thereon, a driving-shaft journaled above and at one side of the center line of the driven shaft, and having a gear thereon, and a solid intermediate power-transmitting gear arranged without internal bearings, and supported on the driven shaft so as to tend to wedge itself by gravity between the driving and driven gears.

4. In a power-transmitting gearing, the combination of a driven shaft having a flanged wheel or wheels secured thereon, a driving-shaft, and a floating power-transmitting wheel supported on the flanged wheels of the driven shaft at one side of the center line thereof, and tending to wedge itself by gravity into engagement with gears on the driving-shaft and driven shaft.

5. In a power-transmitting gearing, the combination of a driving-shaft, a shaft to be driven, wheels secured on the driving-shaft, flanged wheels secured on the driven shaft, and a floating intermediate power-transmitting wheel supported without internal bearings upon the driven shaft, so as to tend to wedge itself by gravity into engagement with said shaft and held in place by the flanges on the wheels of the driven shaft.

6. In a power-transmitting gearing, the combination of a shaft to be driven having wheels thereon, a driving-shaft having a wheel thereon journaled above and at one side of the center of the driven shaft, a floating intermediate power-transmitting wheel supported without internal bearings to rest on the driven shaft, so as to tend to wedge itself by gravity into engagement with the wheels on the driving-shaft and driven shaft respectively, a tooth-gear on the driving-shaft, a tooth-gear on the driven shaft, and a tooth-gear turning with the intermediate wheel and meshing with the two previously-named gears to maintain a constant speed ratio between the driving-shaft and the driven shaft.

7. In a power-transmitting gearing, the combination of a driven shaft, flanged wheels secured on the driven shaft, a driving-shaft journaled above and at one side of the driven shaft, a wheel secured upon the driving-shaft, a floating intermediate power-transmitting wheel resting upon the wheels of the driven shaft and held from lateral displacement by the flanges thereof, in position tending to wedge itself by gravity into engagement with the wheels on the driving-shaft and driven shaft respectively, and toothed gears on the driving-shaft, driven shaft, and intermediate power-transmitting wheel for maintaining a substantially constant speed ratio between the driving-shaft and driven shaft.

8. In a power-transmitting and multiplying gearing, the combination of a framework, a driving-shaft and a shaft to be driven journaled in the framework and carrying wheels, a heavy intermediate power-transmitting wheel arranged to wedge itself by gravity into engagement with the wheels on the driving-shaft and shaft to be driven, said wheels being arranged inside said framework, and supplemental weights secured on the shaft of the intermediate power-transmitting wheel outside the framework.

In testimony whereof I have hereunto set my hand in the presence of two subscribing witnesses.

ELIE BENOIT.

Witnesses:
  M. E. FORDE,
  LOUIS W. SOUTHGATE.